(12) United States Patent
Hasegawa et al.

(10) Patent No.: US 7,856,021 B2
(45) Date of Patent: Dec. 21, 2010

(54) PACKET TRANSFER METHOD AND APPARATUS

(75) Inventors: Tohru Hasegawa, Osaka (JP); Nobuo Shirai, Osaka (JP)

(73) Assignee: Fujitsu Limited, Kawasaki (JP)

( * ) Notice: Subject to any disclaimer, the term of this patent is extended or adjusted under 35 U.S.C. 154(b) by 812 days.

(21) Appl. No.: 11/329,967

(22) Filed: Jan. 11, 2006

(65) Prior Publication Data

US 2006/0146872 A1    Jul. 6, 2006

Related U.S. Application Data

(63) Continuation of application No. PCT/JP03/09196, filed on Jul. 18, 2003.

(51) Int. Cl.
*H04L 12/28* (2006.01)
*H04L 12/66* (2006.01)

(52) U.S. Cl. ............................ 370/395.43; 370/352

(58) Field of Classification Search ............... 370/474, 370/395.21, 395.41, 352, 340, 395.64, 395.61, 370/395.52, 395, 395.51, 395.42, 392, 397, 370/389, 419, 420
See application file for complete search history.

(56) References Cited

U.S. PATENT DOCUMENTS

| | | | |
|---|---|---|---|
| 6,188,671 B1 * | 2/2001 | Chase et al. ............... | 370/232 |
| 6,493,317 B1 * | 12/2002 | Ma ........................... | 370/237 |
| 6,643,292 B2 * | 11/2003 | Chapman et al. ......... | 370/395.52 |
| 6,967,927 B1 * | 11/2005 | Dugeon et al. ........... | 370/236.1 |
| 6,993,023 B2 * | 1/2006 | Foster et al. .............. | 370/389 |
| 7,023,856 B1 * | 4/2006 | Washabaugh et al. .... | 370/395.1 |
| 7,177,275 B2 * | 2/2007 | Stanwood et al. ........ | 370/230 |

FOREIGN PATENT DOCUMENTS

| | | |
|---|---|---|
| JP | 10-070566 | 3/1998 |
| JP | 2001-045066 | 2/2001 |
| JP | 2001-189754 | 7/2001 |

* cited by examiner

*Primary Examiner*—Hanh Nguyen
(74) *Attorney, Agent, or Firm*—Katten Muchin Rosenman LLP

(57) ABSTRACT

When a partial rate guaranteed service is applied to a communication line connecting predetermined routers, a TCP tunnel (TCP connection) is established between the routers, a packet whose destination is a router connected to the communication line is passed through the TCP tunnel, and other packets of an application using a UDP of a VoIP or the like are forwarded by a normal routing control without being passed through the TCP tunnel.

12 Claims, 7 Drawing Sheets

PACKET TRANSFER METHOD AND APPARATUS

CROSS-REFERENCE TO RELATED APPLICATION

This application is a continuation of International Application PCT/JP03/09196 filed on Jul. 18, 2003, the contents of which are herein wholly incorporated by reference.

BACKGROUND OF THE INVENTION

1. Field of the Invention

The present invention relates to a packet transfer method and apparatus, and in particular to a packet transfer method and apparatus in a relay line between routers.

2. Description of the Related Art

Services of a network carrier using an ATM (Asynchronous Transfer Mode) technology include the following two services:

(1) CBR (Constant Bit Rate) type: Rate guaranteed service guaranteeing a fixed bandwidth;
(2) GFR (Guaranteed Frame Rate) type: Partial rate guaranteed service (or rate semi-guaranteed service) having both of a best-effort part and a guaranteed part (guaranteed rate part).

In the above-mentioned rate guaranteed service (1), a fixed rate is constantly guaranteed. Namely, the rate guaranteed service is used for communication of an application constantly requiring a fixed rate bandwidth, and communication of an application which is weak in a delay fluctuation or a data loss. Packets exceeding the maximum rate are discarded.

In the above-mentioned partial rate guaranteed service (2), the minimum (contract) guaranteed rate is constantly guaranteed in a Mega Data Netz (MDN) line or the like. In the same way as the above-mentioned rate guaranteed service (1), cells exceeding the maximum rate are discarded. Since the bandwidths equal to or more than the minimum guaranteed rate and equal to or less than the maximum rate are commonly used by a plurality of users, and may be used with the maximum rate as an upper limit depending on a traffic situation, this partial rate guaranteed service is suitable for a TCP/IP communication or the like performing a flow control and retransmission processing.

In such a partial rate guaranteed service, as exemplified in FIG. 8, a virtual path (VP) bandwidth shown by thick lines is established as a relay line 5 between routers (stations) 3 and 4.

Supposing that e.g. virtual channel (VC) bandwidths for respective users (terminals) A, B, and C are assigned for the virtual path bandwidth of the relay line 5, the virtual channel bandwidth for the user C is guaranteed with equal to or less than a maximum rate Rmax and equal to or more than a minimum guaranteed rate Rg (rate of 10%, 50%, or the like of the maximum rate) as shown in FIG. 8. The same applies to the other users A and B. Accordingly, the virtual path bandwidth of the relay line 5 is set smaller than a total value of the virtual channel guaranteed bandwidths for the users.

When such a partial rate guaranteed service is applied to the relay line between routers, the routers can not recognize the guaranteed bandwidth (guaranteed rate) of the line in real time. For this reason, the router on the transmission side constantly is to transmit through a relay line, data forwarded (transferred) at the maximum rate Rmax like the virtual channel bandwidth for the user C as shown in FIG. 8. Otherwise, effective use of the line service can not be maximized if the transmission at the maximum rate is not performed although it is actually enabled.

However, since the virtual path bandwidth of the relay line 5 is set smaller than the total value of the virtual channel guaranteed bandwidths for the users as mentioned above, when the virtual channel bandwidth for the line of the user C is reduced to the maximum rate or less by a competition with the user A or the user B, the router 3 continues the data transmission at the maximum rate as heretofore. The part exceeding the actual VP bandwidth of the line at that time is buffered somewhere in the network. However, if the part exceeds the buffering limit, the part is discarded in the network.

In this case, the amount of data which is actually buffered and kept within the network without being discarded is not published by the network carrier side under the present circumstances.

Accordingly, when a data discard occurs in the relay line 5 between the routers 3 and 4, and e.g. a communication application (software) between end users uses TCP protocol, the TCP protocol detects the data discard, performs the retransmission control of the data between the end users, and performs a slow start control of the transmission rate between the end users, thereby extremely reducing the communication rate.

Subsequently, the transmission rate is gradually increased by the flow control of the TCP application between the end users. When the packet discard occurs again in the line part, a slow start, a transmission rate increase, and a packet discard are repeated.

As a result, there is a problem that retransmission packets are increased within the network and the slow start control of the communication between the end users due to the packet discard results in the reduction of the communication efficiency.

On the other hand, there is a QoS provision method setting a traffic category (one of CBR, VBR-rt, VBR-nrt, UBR, and GFR) in an IP header when a user side transmits an IP packet in order to guarantee a quality of service by separating traffic categories into a best effort type category and a real time type category, selecting either of the traffic categories mentioned above based on the IP header when each router receives the IP packet, and guaranteeing the quality of service of the concerned traffic category (see e.g. patent document 1).

Furthermore, there is a bandwidth securing VPN configuring method establishing an IP tunnel between routers connected to the Internet in order to secure a bandwidth of a VPN per cost or subnet, reserving a transmission bandwidth of the IP tunnel by starting up a network resource reservation protocol on the IP tunnel, thereby securing the bandwidth of the VPN per cost or subnet (see e.g. patent document 2).

<Patent Document 1>
Japanese Patent Application Laid-open No. 2001-189754 (FIG. 1 & Abstract)<

Patent Document 2>
Japanese Patent Application Laid-open No. 10-70566 (FIG. 1 & Abstract)

SUMMARY OF THE INVENTION

It is accordingly an object of the present invention to provide a packet transfer method and apparatus for transferring packets by a partial rate guaranteed service, whereby a packet amount discarded within a network is reduced.

In order to achieve the above-mentioned object, a packet transfer method according to the present invention comprises: a first step of setting a partial rate guaranteed service to an available line with an opposed device; a second step of establishing a TCP tunnel with the opposed device of the available line in response to the setting of the partial rate guaranteed service; and a third step of encapsulating, when a destination of a packet inputted indicates the opposed device, the packet to be passed through the TCP tunnel.

Namely, at the first step, the above-mentioned partial rate guaranteed service is selected and set onto e.g. an available relay line 5 between predetermined routers 3 and 4 as shown in FIG. 1. At the second step, a TCP tunnel (connection) 6 is established with the router 4 which is an opposed device of the available line 5 by the router 3 in response to the partial rate guaranteed service having been thus set.

At the third step, when a destination of a packet inputted to the router 3 indicates the router 4 which is the opposed device, the packet is encapsulated to be passed through the TCP tunnel 6.

When the partial rate guaranteed service which is cheap but without a 100% guarantee for quality is applied for the available relay line, a TCP tunnel is established on a TCP layer different from a path for transmitting normal data between routers, so that a communication line is secured as a TCP tunnel where the established TCP tunnel is constantly established between the terminals (end users).

Thus, a relay data stream between the routers is passed through the TCP tunnel between the routers. When a data discard occurs on the relay line, a retransmission and a congestion control of the TCP application are executed between the routers 3 and 4, so that the packet discard between the end routers disappears. Accordingly, a slowdown due to the data discard on the relay line is avoided between the end users.

The above-mentioned third step may include a step of selecting whether or not the packet should be passed through the TCP tunnel depending on a priority of the packet.

Namely, as shown in FIG. 2, in order to efficiently use communication data, such as VoIP data the discard of which is preferable to the retransmission thereof, and the bandwidth, a priority is included in a packet, and a control of passing only packets prioritized through the TCP tunnel 6 based on the priority and of passing other packets through a general path 7 can be performed.

For this control, the priority of data may be determined by a TOS (Type Of Service) field value set in an IP header of a packet. According to the priority, as mentioned above, important data, general data, or the like may be classified to determine whether or not the data should be transferred to the TCP tunnel 6 by the router.

Thus, an efficient use of a bandwidth and high-quality communication for important data can be realized.

Also, the above-mentioned second step may include a step of registering the packet separately in either a buffer for the TCP tunnel or a buffer for others.

Also, in the present invention, for realizing the above-mentioned packet transfer method, an apparatus comprising: a first means setting a partial rate guaranteed service to an available line with an opposed device; a second means establishing a TCP tunnel with the opposed device of the available line in response to the setting of the partial rate guaranteed service; and a third means encapsulating, when a destination of a packet inputted indicates the opposed device, the packet to be passed through the TCP tunnel may be provided.

The above-mentioned third means may include a means selecting whether or not the packet should be passed through the TCP tunnel depending on a priority of the packet.

Also, the priority in this case may be indicated by a TOS (Type Of Service) field in a header of an IP packet.

Also, the above-mentioned second means may include a means registering the packet separately in either a buffer for the TCP tunnel or a buffer for others.

As the partial rate guaranteed service, a GFR (Guaranteed Frame Rate) executed in an ATM network may be used.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
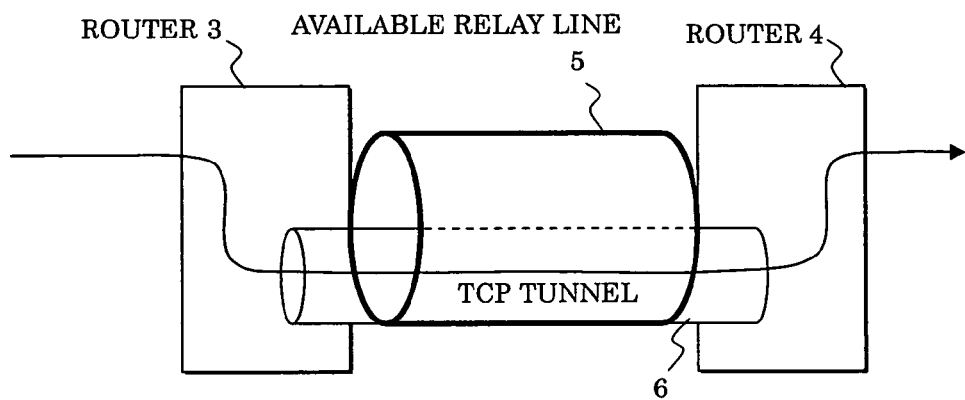
FIG. 1 is a block diagram showing a principle of a packet transfer method and apparatus according to the present invention.
Figure 2:
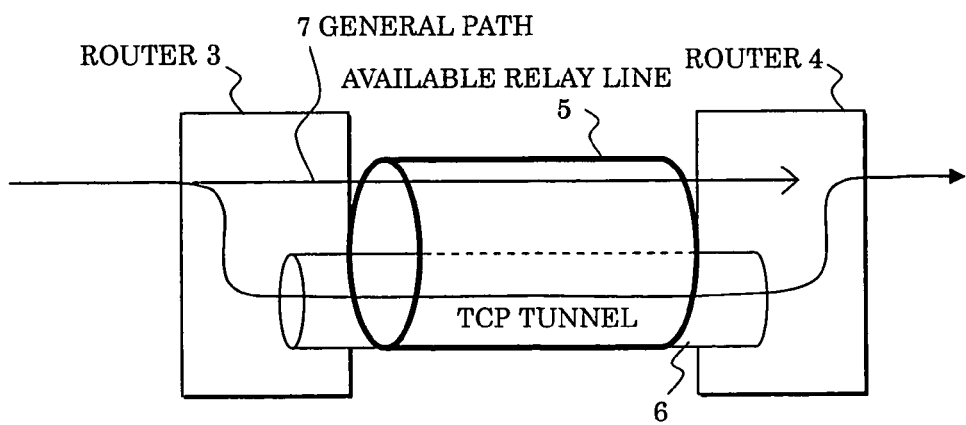
FIG. 2 is a block diagram showing a modification of FIG. 1.
Figure 3:
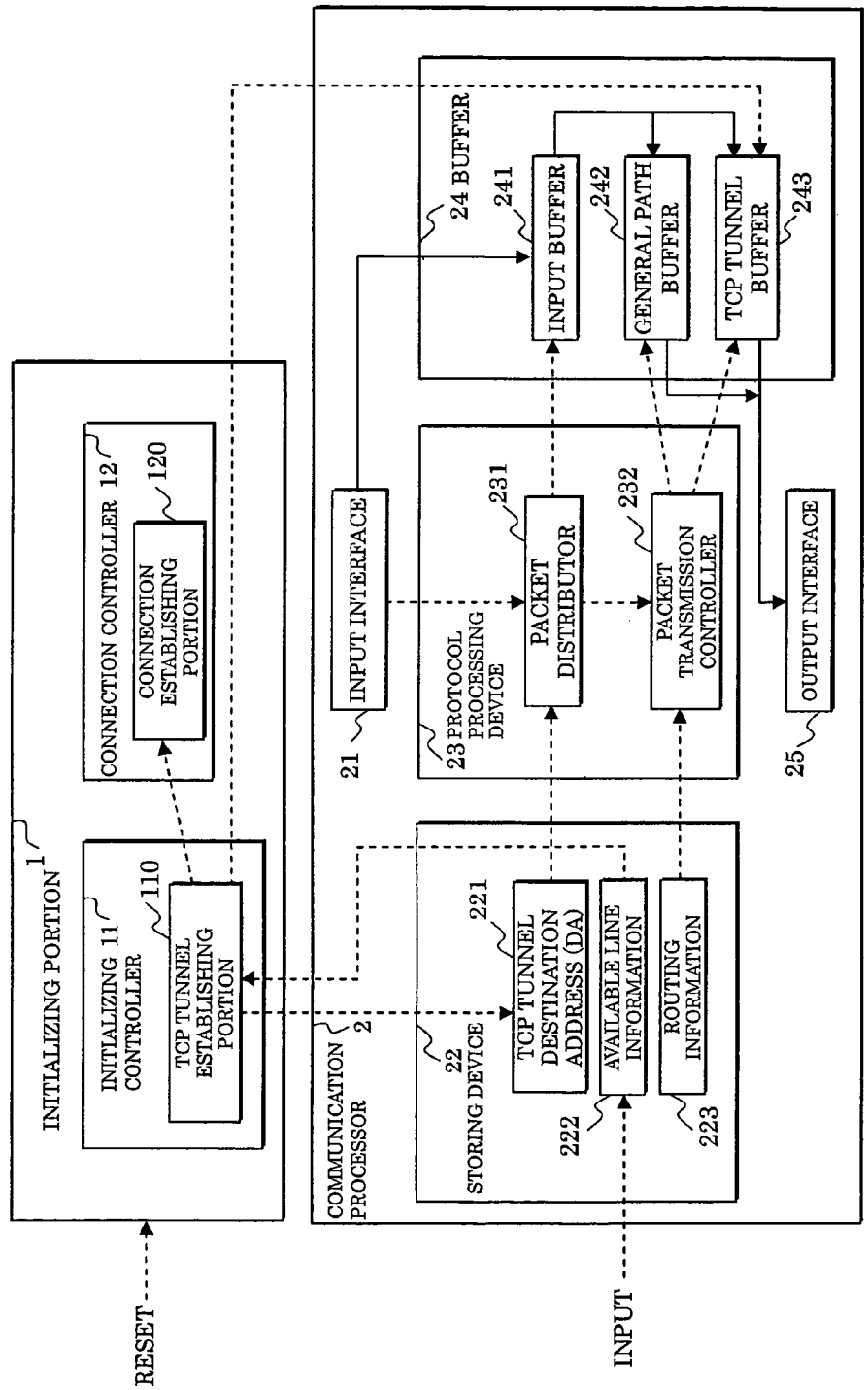
FIG. 3 is a block diagram showing an embodiment of an apparatus realizing a packet transfer method according to the present invention.

FIG. 3 shows a packet transfer apparatus realizing a packet transfer method according to the present invention. This packet transfer apparatus is provided in the router 3 on the transmission side shown in FIGS. 1 and 2, and is composed of an initializing (initial setting) portion 1 and a communication processor 2.

The initializing portion 1 includes an initializing controller 11 and a connection controller 12. The initializing controller 11 includes a TCP tunnel establishing portion 110, and the connection controller 12 includes a connection establishing portion 120.

Also, the communication processor 2 is composed of an input interface 21, a storing device 22, a protocol processing device 23, a buffer 24, and an output interface 25.

The storing device 22 among them includes a TCP tunnel destination address (DA) 221, available line information 222, and routing information 223.

Also, the protocol processing device 23 includes a packet distributor 231 and a packet transmission controller 232.

Furthermore, the buffer 24 includes an input buffer 241, a general path buffer 242, and a TCP tunnel buffer 243.

Hereinafter, the operation of the embodiment of the packet transfer apparatus according to the present invention shown in FIG. 3 will be described referring to FIGS. 1, 2, and 4-7.

Figure 4:
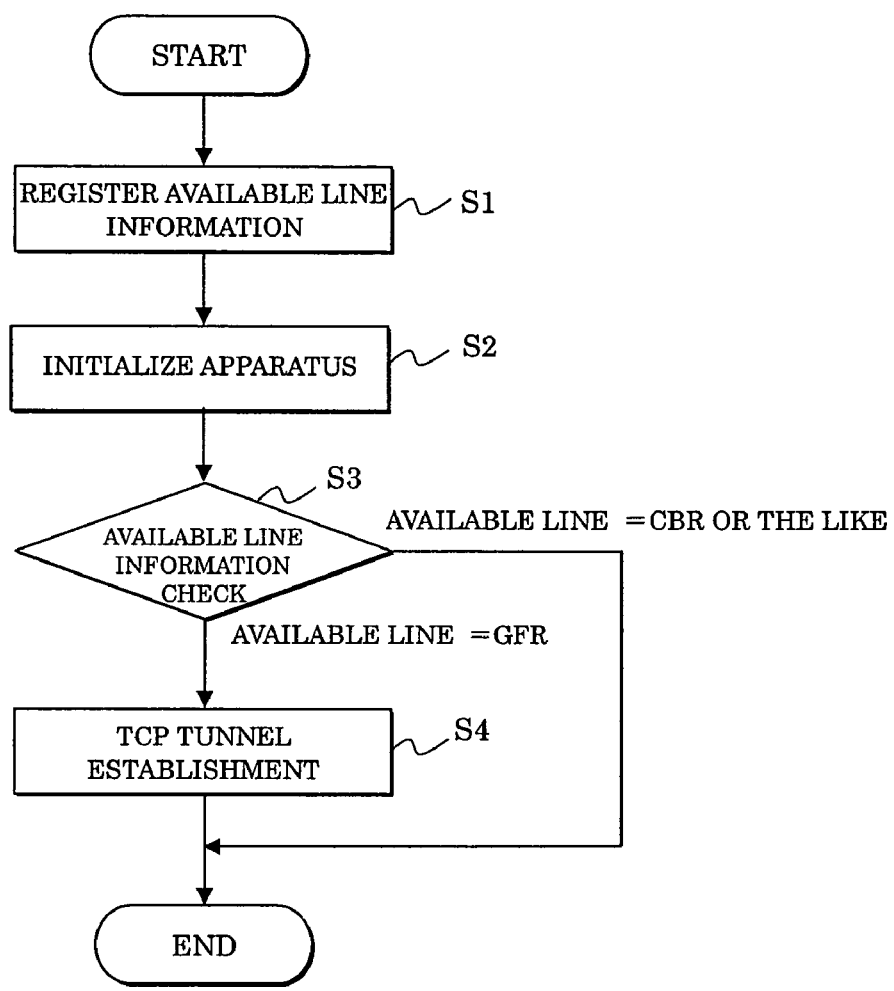
FIG. 4 is a flowchart for specifically illustrating an operation of a TCP tunnel establishing portion in the embodiment shown in FIG. 3.

Firstly in FIG. 4, a user (not end user) in the router 3 inputs the available line information 222 in the storing device 22 in the communication processor 2 to be registered (at step S1). In the available line information 222, a partial rate guaranteed service (GFR) is set if it is desired, or another rate guaranteed service (CBR) or the like is set if it is desired for an available line between predetermined routers (e.g. between routers 3 and 4 in FIGS. 1 and 2).

Thereafter, the packet transfer apparatus shown in FIG. 3 is initialized (at step S2). The user provides a reset signal as shown in the initializing portion 1, thereby performing reset operation for the initializing controller 11 and the connection controller 12 within the initializing portion 1 (at step S2).

When the reset signal is provided to the initializing controller 11, the TCP tunnel establishing portion 110 in the initializing controller 11 reads the available line information 222 in the storing device 22 to be checked (at step S3).

Namely, the available line information 222 registered at step S1 indicates that the relay line 5 between the routers 3 and 4 is a line of the above-mentioned rate guaranteed service (CBR) or the like, or a line of the partial rate guaranteed service (GFR). Therefore, when it is consequently found that the available line is the GFR type, the TCP tunnel 6 is established by instructions to the connection establishing portion 120 in the connection controller 12 (at step S4). When it is found that the available line is the CBR type, the step S4 is skipped and the process is ended.

Figure 5:
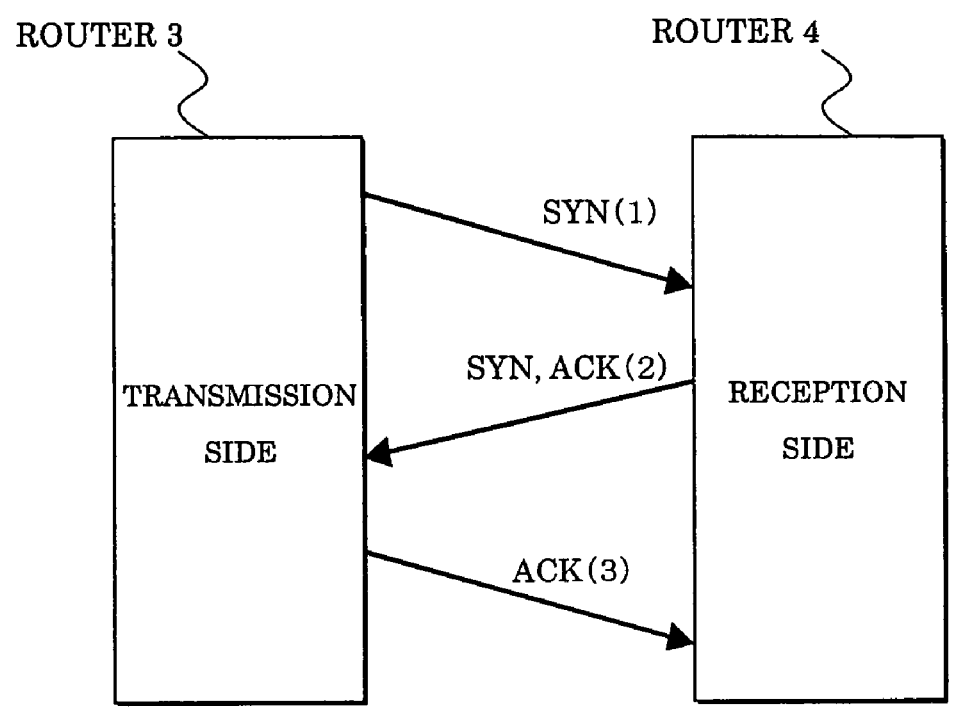
FIG. 5 is a sequence diagram showing an example of the TCP tunnel establishment shown in FIG. 4.

FIG. 5 shows a procedure of establishing the TCP tunnel 6 by the connection establishing portion 120 at step S4.

Namely, upon the tunnel establishment, the connection establishing portion 120 establishes a connection in the same way as normal transmission/reception processing as follows:
(1) The router 3 on the transmission side transmits "Establishment request (SYN)";
(2) The router on the reception side simultaneously returns "Establishment request (SYN)" and "Acknowledgement (ACK) response for establishment request";
(3) The router 3 on the transmission side transfers "Acknowledgement (ACK) response for establishment request".

It is to be noted that while a normal connection is released after transmission/reception of data, the TCP tunnel of the present invention stays resident without being released. Since this connection identifies a destination with a pair of an IP address and a port No., it is possible to establish a plurality of TCP tunnels for the destination. By using an arbitrary port No., whether or not the TCP tunnel is released is determined.

Thus, after or before the TCP tunnel 6 is established by the TCP tunnel establishing portion 110 together with the connection establishing portion 120, the TCP tunnel establishing portion 110 stores the destination address of the TCP tunnel 6 in the TCP tunnel destination address 221 within the storing device 22.

Figure 6:
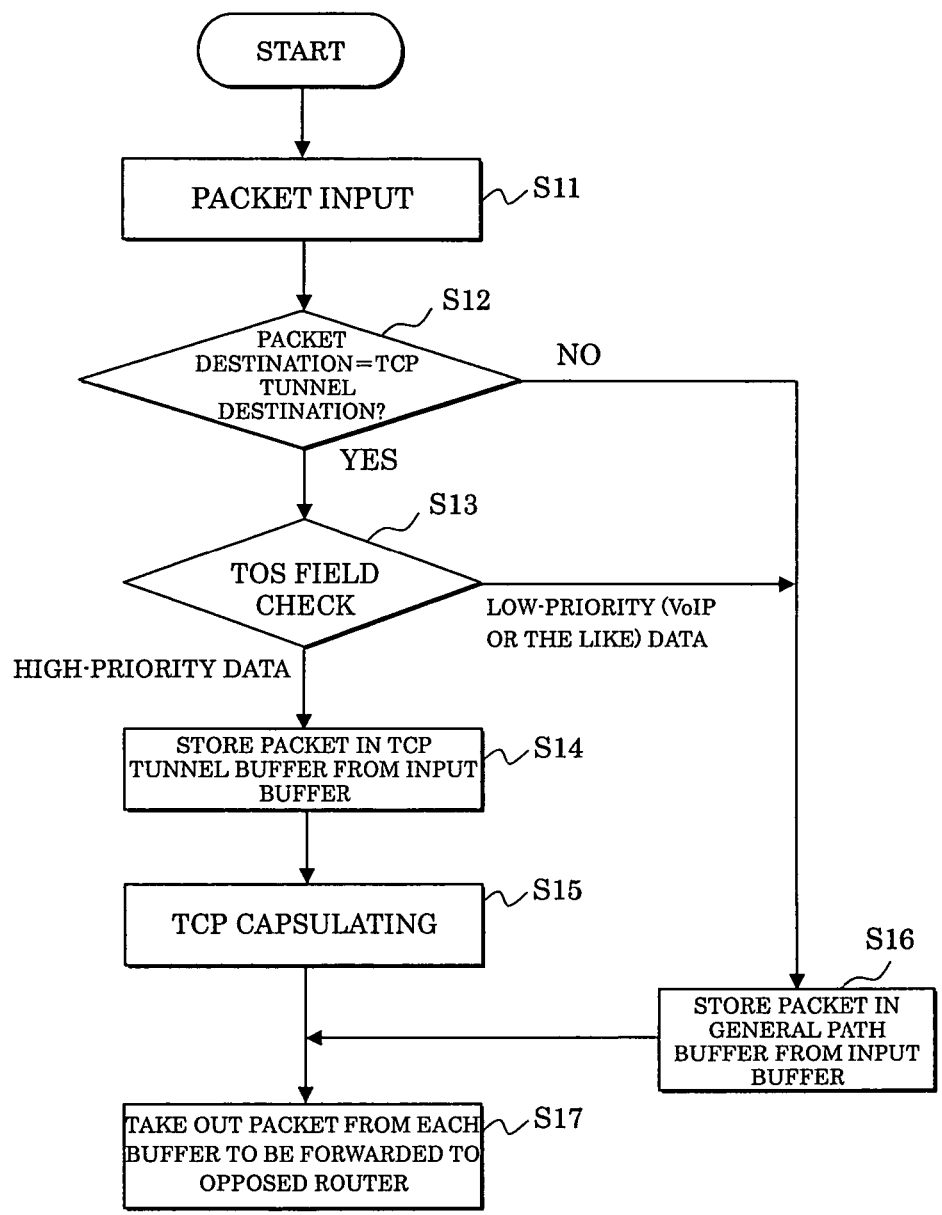
FIG. 6 is a flowchart showing an operation of a packet distributor and a packet transmission controller shown in FIG. 3.

The communication processor 2 handles the packet inputted to the input interface 21 as shown in FIG. 6.

Namely, when the packet is firstly inputted (at step S11), whether or not the destination of the packet is the destination of the TCP tunnel 6 is determined (at step S12). When the packet distributor 231 in the protocol processing device 23 recognizes that the destination address indicated in the IP header of the packet inputted is the destination of the TCP tunnel 6, e.g. the address of the router 4 set in the TCP tunnel destination address 221 as mentioned above, by referring to a TCP destination address (DA) 221 in the storing device 22, the process proceeds to step S13. If not the case, the process proceeds to step S16.

Namely, when it is recognized that the input packet should be passed through the TCP tunnel 6, the priority of data is further checked (at step S13). This checking is performed based on whether or not a TOS field in the IP header of the input packet is set to a value whose priority is high.

For example, when it is recognized that a low priority corresponding to general data, which may be discarded, such as VoIP is set in a TOS field, the process proceeds to step S16, in which the packet distributor 231 controls the input buffer 241 and transfers the packet inputted by the input interface 21 to the general path buffer 242 from the input buffer 241 to be stored.

On the other hand, when a value whose priority is high is set in the TOS field, the packet distributor 231 controls the input buffer 241 so that the input packet may be stored in the TCP tunnel buffer 243 from the input buffer 241 (at step S14).

After step S14, the packet transmission controller 232 performs the TCP capsulating to the packet stored in the TCP tunnel buffer 243 (at step S15).

Figure 7:
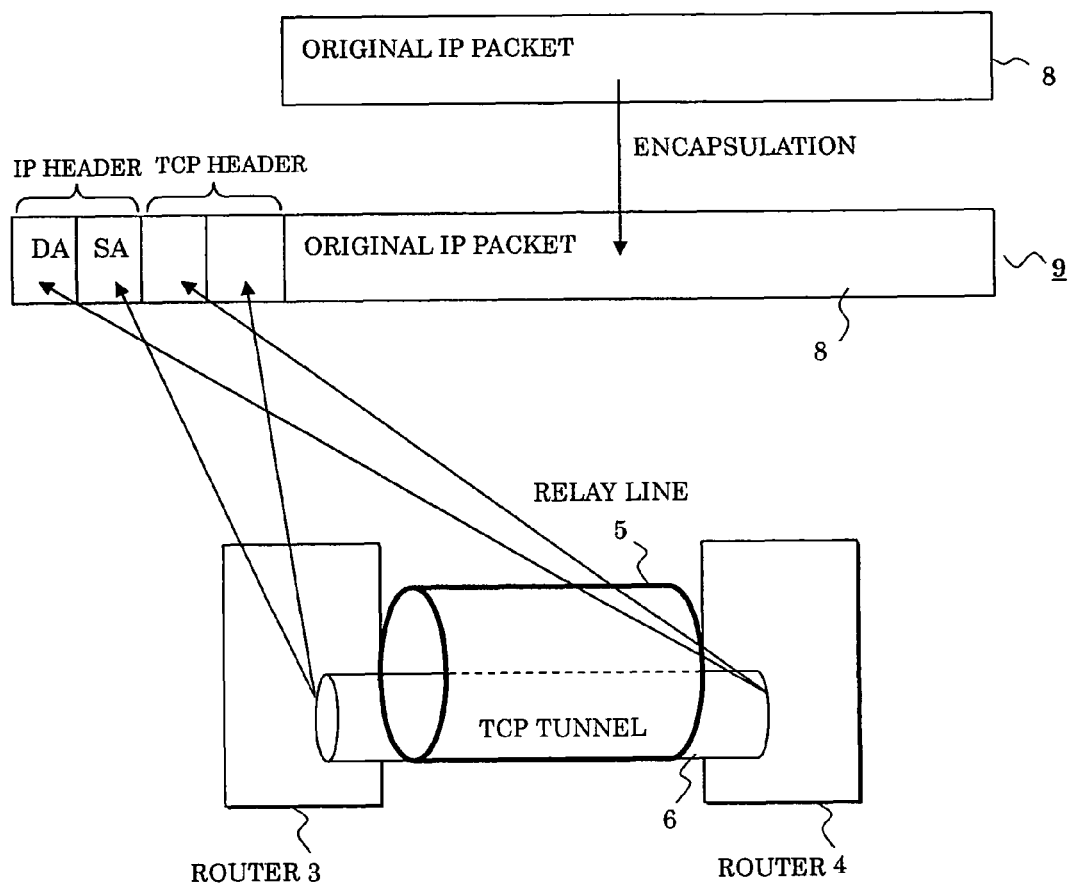
FIG. 7 is a block diagram showing an encapsulation at the time when a packet passes through a TCP tunnel in the packet transfer method and apparatus according to the present invention.
Figure 8:
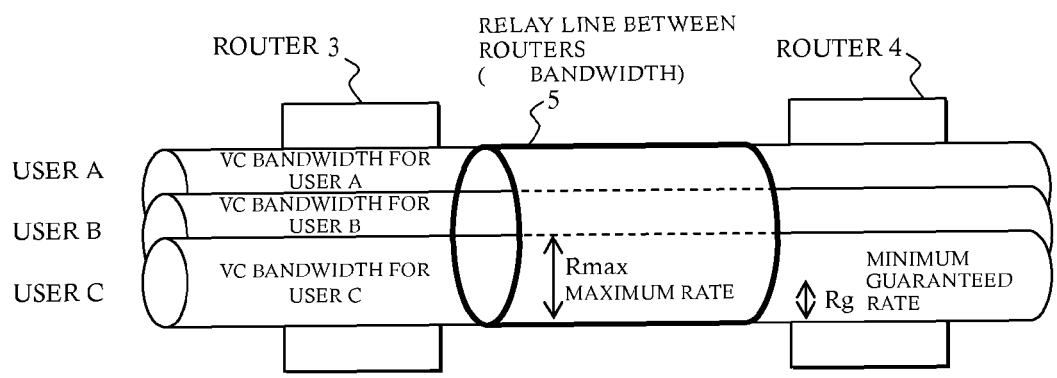
FIG. 8 is a diagram illustrating a partial rate guaranteed (GFR) service.

FIG. 7 shows a procedure of the TCP capsulating. Namely, an original IP packet 8 is stored in the TCP tunnel buffer 243 and an IP header and a TCP header are added thereto, thereby converting the packet into a packet 9 encapsulated so as to pass through the TCP tunnel 6.

In this case, a source IP address of the encapsulated packet 9 indicates the router 3, the destination IP address thereof indicates the router 4, and the source TCP port No. indicates the router 3, and the destination TCP port No. thereof indicates the router 4.

Thereafter, the packet transmission controller 232 forwards the packets stored in the TCP tunnel buffer 243 respectively from the output interface 25 to the TCP tunnel 6. The packet transmission controller 232 forwards the packets stored in the general path buffer 242 from the output interface 25 to the general path (see FIG. 2) by referring to the routing information 233 in the storing device 22 (at step S17).

As described above, the packet transfer method and apparatus according to the present invention are arranged so that when a partial rate (bandwidth) guaranteed service is applied to a communication line with an opposed device, a TCP tunnel (TCP connection) is established with the opposed device, a packet whose destination is the opposed device connected to the line is passed through the TCP tunnel, and other packets are forwarded not through the TCP tunnel by a normal routing control. Therefore, a fluctuation of a communication quality (bandwidth) between routers occurring when rate non-guaranteed service which is cheap but without a 100% guarantee for quality is applied for the available relay line between the routers is absorbed by a new arrangement on the router side using the services, thereby enabling a network configuration with high quality even when the cheap communication service is applied.

What is claimed is:

1. A packet transfer method comprising:
  setting a plurality of partial rate guaranteed services to an available line between a device and an opposed device, each of said partial rate guaranteed services providing a minimum guaranteed transmission rate and a best effort transmission rate;
  establishing a TCP tunnel between the device and the opposed device of the available line in response to the setting of said partial rate guaranteed services; and
  encapsulating, when a destination of a packet inputted indicates the opposed device, the packet to be passed through the TCP tunnel, wherein
  the encapsulating includes selecting such that the IP packet is passed through the minimum guaranteed transmission rate part of the partial rate guaranteed services in the established TCP tunnel when the TOS (Type Of Service) field in a header of the packet indicates a high priority while the packet is passed through the best effort transmission rate part of the partial rate guaranteed services in the established TCP tunnel when the TOS field in a header of the packet indicates a low priority.

2. The packet transfer method as claimed in claim 1, wherein the priority is indicated by a TOS (Type Of Service) field in a header of an IP packet.

3. The packet transfer method as claimed in claim 2, wherein the establishing includes registering the packet separately in either a buffer for the TCP tunnel or a buffer for others.

4. The packet transfer method as claimed in claim 1, wherein the establishing includes registering the packet separately in either a buffer for the TCP tunnel or a buffer for others.

5. The packet transfer method as claimed in claim 1, wherein said partial rate guaranteed services comprises a GFR (Guaranteed Frame Rate) executed in an ATM network.

6. The packet transfer method as claimed in claim 1, wherein the establishing includes registering the packet separately in either a buffer for the TCP tunnel or a buffer for others.

7. A packet transfer apparatus comprising:
- a first portion setting a plurality of partial rate guaranteed services each providing a minimum guaranteed transmission rate and a best effort transmission rate to an available line between a device and an opposed device;
- a second portion establishing a TCP tunnel between the device and the opposed device of the available line in response to the setting of said partial rate guaranteed services; and
- a third portion encapsulating, when a destination of a packet inputted indicates the opposed device, the packet to be passed through the TCP tunnel, wherein the third portion includes a portion selecting such that the IP packet is passed through the minimum guaranteed transmission rate part of the partial rate guaranteed services in the established TCP tunnel when the TOS (Type Of Service) field in a header of the packet indicates a high priority while the packet is passed through the best effort transmission rate part of the partial rate guaranteed services in the established TCP tunnel when the TOS field in a header of the packet indicates a low priority.

8. The packet transfer apparatus as claimed in claim 7, wherein the priority is indicated by a TOS (Type Of Service) field in a header of an IP packet.

9. The packet transfer apparatus as claimed in claim 8, wherein the second portion includes a portion registering the packet separately in either a buffer for the TCP tunnel or a buffer for others.

10. The packet transfer apparatus as claimed in claim 7, wherein the second portion includes a portion registering the packet separately in either a buffer for the TCP tunnel or a buffer for others.

11. The packet transfer apparatus as claimed in claim 7, wherein said partial rate guaranteed services comprises a GFR (Guaranteed Frame Rate) executed in an ATM network.

12. The packet transfer apparatus as claimed in claim 7, wherein the second portion includes a portion registering the packet separately in either a buffer for the TCP tunnel or a buffer for others.

* * * * *